United States Patent Office 3,231,611
Patented Jan. 25, 1966

3,231,611
PURIFICATION OF SALICYLANILIDE
Theodore E. Majewski, Wesley C. Stoesser, and Edward S. Parsey, Midland, Mich., assignors to The Dow Chemical Company, Midland, Mich., a corporation of Delaware
No Drawing. Filed Mar. 1, 1963, Ser. No. 262,248
4 Claims. (Cl. 260—559)

This invention relates to a method for purifying salicylanilide and it relates particularly to a method for removing a hitherto unrecognized impurity which is found in this material as it is conventionally prepared.

Salicyanilide is ordinarily made by reacting salicylic acid with aniline in the presence of phosphorus trichloride at an elevated temperature. The theoretical proportions of reactants are usually employed for best results, that is, one mole each of aniline and salicylic acid to a third of a mole of phosphorus trichloride. An improved process employs an inert organic solvent as a reaction diluent. The product thereby obtained is apparently of good quality as determined by melting point and ordinary methods of analysis. However, when such a product is used as a chemical intermediate, for example, in preparing halogenated derivatives, troublesome impurities such as halogenated salicylates and the like are often found in the reaction product. Formerly, it was thought that these impurities originated from the splitting of the salicylanilide itself during the reaction, since no corresponding quantity of a parent impurity was known to be present in the starting material.

It has now been discovered by improved methods of analysis that salicylanilide prepared as described above commonly contains as much as three percent by weight or more of salicylanilide salicylate, this compound having the structure shown.

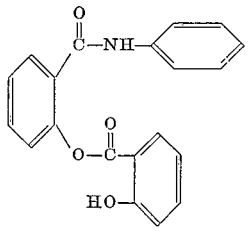

Since this compound is very similar to salicylanilide itself, relatively small concentrations of it in salicylanilide are difficult to detect by many analytical methods and have only slight effect on the melting point.

Recrystallization of the impure salicylanilide is effective to some extent in reducing the amount of this impurity. However, this is not an economically desirable purification procedure for a material used in bulk quantities. According to the present invention, the proportion of this impurity in salicylanilide is substantially reduced or even essentially eliminated by heating the impure salicylanilide with aniline at a temperature of about 50° C. to about 180° C. In the reaction thereby caused, a mole of aniline reacts with a mole of the salicylanilide salicylate to produce two moles of salicylanilide. Although any quantity of aniline will give an improved product, for obvious reasons at least about one mole of aniline per mole of salicylanilide salicylate is preferred.

Preferably, this purification reaction is carried out in an inert solvent solution. Suitable inert solvents include aliphatic and cycloaliphatic hydrocarbons such as octane, decane, petroleum naphtha, cyclohexane, and decahydronaphthalene, chlorinated aliphatic hydrocarbons such as carbon tetrachloride, aromatic hydrocarbons and their chlorinated derivatives such as benzene, toluene, ethylbenzene, chlorobenzene, o-dichlorobenzene and the like. Other solvents which are unreactive with the reactants under the conditions of the process are also suitable.

While one mole of aniline per mole of salicylanilide salicylate is obviously enough theoretically to remove all of this impurity by reacting with it, somewhat more than this quantity is often preferred for best results and for convenience in measuring the small amount involved. For example, from one to fifty moles of aniline per mole of impurity may be employed. When, as is preferred, the reaction is run in a solvent, excess aniline is easily removed in the solvent separation step.

The process can be run in a number of ways. For example, impure salicylanilide may be dissolved in a solvent with added aniline and the solution heated for an appropriate time. Heating periods of about 1–10 hours are usually sufficient, the exact time being dependent upon the temperature used. The thereby purified salicylanilide is then separated from the solution by conventional means. A particularly advantageous separation is accomplished by steam distilling the solvent and excess aniline from the solution, thereby leaving an aqueous slurry of crystalline salicylanilide as the distillation residue. Chlorobenzene is therefore a particularly preferred solvent for use in this process, since it has a convenient boiling point and forms an azeotrope with water. Filtration and drying yields the purified product.

Most advantageously, this purification method is incorporated as a modification of the improved process wherein salicylanilide is made by reacting aniline, salicylic acid, and phosphorus trichloride in the presence of an inert solvent. In this mode of operation the excess aniline can be added at some stage after the initial reaction period and before the removal of the solvent. Best results are obtained by adding the excess aniline to the reaction mixture after removal by water wash of the phosphorus acid by-product and residual hydrogen chloride.

Although it might seem to be a probable equivalent of the presently claimed process to use an excess of aniline as a starting reactant, such a procedure does not yield a product significantly purer than that obtained by reacting the theoretical quantities of reagents. Only by adding the excess of aniline after the reaction is essentially complete is there substantial reduction of the salicylanilide salicylate impurity in the final product.

The following examples illustrate various ways in which the process has been applied.

*Example 1*

A mixture of 69.0 g. of salicylic acid, 22.8 g. of phosphorus trichloride, 46.6 g. of aniline, and 600 g. of chlorobenzene was heated at 125–133° C. for about 3 hours. The reaction mixture was cooled to 85–90° C. and washed four times with 100 ml. portions of water to remove the phosphorus acid and residual hydrogen chloride. The washed chlorobenzene solution was dried by distilling off chlorobenzene to a distillation heat temperature of 133° C. To the dried chlorobenzene solution there was added 10 g. of aniline and this solution was heated at reflux temperature for 7 hours. The chlorobenzene and excess aniline were removed by steam distillation, leaving as a distillation residue an aqueous slurry of crystalline salicylanilide. The salicylanilide was filtered off at 25° C. The filter cake was washed with water, reslurried in 100 ml. of 15% aqueous sodium carbonate, and filtered and washed again with water. The dried salicylanilide amounted to 76.7 g., M.P. 136.0–136.4° C. This material contained 0.1% salicylanilide salicylate by analysis.

A reaction was run as shown above but omitting the addition of excess aniline. The yield of salicylanilide was similar to that shown but the product had a melting point of 133–134° C. and it contained 3.3% salicylanilide salicylate.

*Example 2*

The reaction of Example 1 was repeated except that the washed chlorobenzene solution was not dried before addition of excess aniline. The wet chlorobenzene solution was refluxed for 4 hours with 5 g. of aniline. The solution was then steam distilled and worked up as in Example 1. The salicylanilide obtained melted at 136.0–136.4° C. and contained 0.6% salicylanilide salicylate.

Example 3 illustrates the somewhat reduced effectiveness of the method when excess aniline is added to the reacted mixture without removing the phosphorus acid layer.

*Example 3*

The reaction mixture of Example 1 was heated at 125–133° C. for about 3 hours. To this mixture there was then added 4.7 g. of aniline and the mixture was heated at reflux for an additional 3 hours. The reaction mixture was cooled to 100° C. and the chlorobenzene and excess aniline were removed by steam distillation. The residual aqueous slurry of salicylanilide was filtered, washed with water, and reslurried in 100 ml. of 15% sodium carbonate solution. The salicylanilide was filtered and washed again with water. A yield of 84.7 g. of dry salicylanilide was obtained. This product had a melting point of 135.6–136.2° C. and contained 1.2% salicylanilide salicylate by analysis.

When this reaction is run as shown by using a corresponding excess of aniline at the start, the product is similar in quality to that obtained when no excess aniline is employed.

We claim:

1. In a process wherein a mixture comprising aniline, salicylic acid, phosphorus trichloride, and an inert solvent is heated at an elevated temperature until reaction is essentially complete and a product mixture containing salicylanilide and salicylanilide salicylate is produced, the improvement of adding to said product mixture at least about one mole of aniline per mole of salicylanilide salicylate and heating the aniline-product mixture at about 50–180° C.

2. The process of claim 1 wherein the inert solvent is chlorobenzene.

3. In a process for making salicylanilide wherein a mixture comprising aniline, salicylic acid, phosphorus trichloride, and an inert organic solvent is heated at an elevated temperature until reaction is essentially complete and a product mixture containing salicylanilide and salicylanilide salicylate is produced, the reacted mixture is contacted with water, thereby forming an aqueous phase and an organic solvent phase, and said phases are separated, the improvement of adding at least about one mole of aniline per mole of salicylanilide salicylate to said solvent phase, heating the aniline-solvent phase mixture at 50–180° C., and separating salicylanilide therefrom.

4. The process of claim 3 wherein the organic solvent is chlorobenzene.

References Cited by the Examiner

UNITED STATES PATENTS

| 2,763,683 | 9/1956 | Beman et al. | 260—559 |
| 2,764,614 | 9/1956 | Meyer | 260—559 |

FOREIGN PATENTS

| 818,299 | 8/1959 | Great Britain. |

WALTER A. MODANCE, *Primary Examiner.*

NICHOLAS S. RIZZO, *Examiner.*